US012752670B2

(12) United States Patent
Quast et al.

(10) Patent No.: US 12,752,670 B2
(45) Date of Patent: Oct. 6, 2026

(54) LONGITUDINAL SEAT-ADJUSTMENT DEVICE AND VEHICLE SEAT

(71) Applicant: Adient US LLC, Plymouth, MI (US)

(72) Inventors: Ingo Quast, Düsseldorf (DE); Erik Sprenger, Wermelskirchen (DE)

(73) Assignee: Adient US LLC, Plymouth, MI (US)

( * ) Notice: Subject to any disclaimer, the term of this patent is extended or adjusted under 35 U.S.C. 154(b) by 124 days.

(21) Appl. No.: 18/979,798

(22) Filed: Dec. 13, 2024

(65) Prior Publication Data

US 2025/0196728 A1 Jun. 19, 2025

(30) Foreign Application Priority Data

Dec. 15, 2023 (DE) ..................... 10 2023 212 796.2
May 28, 2024 (DE) ..................... 10 2024 204 942.5

(51) Int. Cl.

| | |
|---|---|
| ***B60N 2/20*** | (2006.01) |
| ***B60N 2/07*** | (2006.01) |
| ***B60N 2/075*** | (2006.01) |
| ***B60N 2/08*** | (2006.01) |
| ***B60N 2/12*** | (2006.01) |

(52) U.S. Cl.

CPC ........... *B60N 2/0727* (2013.01); *B60N 2/075* (2013.01)

(58) Field of Classification Search

CPC .. B60N 2/0705; B60N 2/0715; B60N 2/0818; B60N 2/0825; B60N 2/0843; B60N 2/06
USPC ........................................ 248/429; 297/378.1
See application file for complete search history.

(56) References Cited

U.S. PATENT DOCUMENTS 5,234,189 A * 8/1993 Myers .................... B60N 2/071 296/65.13
8,398,144 B2 * 3/2013 Nord, Jr. ................ B60N 2/688 296/65.13
2006/0113816 A1 * 6/2006 Fischer .............. B60N 2/01583 296/65.03
2012/0019037 A1 * 1/2012 Rohnert ............... B60N 2/0818 297/378.1
2012/0080902 A1 * 4/2012 Nord, Jr. .............. B60N 2/0715 296/68.1
2023/0398909 A1 * 12/2023 Rajput ...................... B60N 2/06
2024/0308395 A1 * 9/2024 Flick .................... B60N 2/0868
2025/0196729 A1 * 6/2025 Quast ................... B60N 2/0705
2025/0282262 A1 * 9/2025 Pauls ................... B60N 2/0818

FOREIGN PATENT DOCUMENTS

WO 2023281380 A1 1/2023

* cited by examiner

*Primary Examiner* — Shin H Kim
(74) *Attorney, Agent, or Firm* — Marshall & Melhorn, LLC

(57) ABSTRACT

A longitudinal seat-adjustment device may have one rail arrangement having at least one rail pair and at least one locking element. The rail arrangement is formed from a top rail and a bottom rail, which are movable relative to one another. The at least one locking element is held in a spring-loaded and movable manner on the top rail and blocks a movement of the top rail in the bottom rail in a locking position and enables a movement in an unlocking position. An additional lock is provided, which interacts with the locking element in the locking position in such a way that a movement of the locking element in at least one spatial direction is limited or blocked. A vehicle seat having such a longitudinal seat-adjustment device is also provided.

11 Claims, 12 Drawing Sheets

LONGITUDINAL SEAT-ADJUSTMENT DEVICE AND VEHICLE SEAT

FIELD

The invention relates to a longitudinal seat-adjustment device and to a vehicle seat having such a longitudinal seat-adjustment device.

BACKGROUND

A longitudinal seat-adjustment device generally comprises two rail pairs arranged spaced apart, which are each constructed from two rails, a top rail associated with the seat and a bottom rail associated with the floor of a vehicle. The longitudinal seat-adjustment device furthermore comprises at least one spring-loaded, movable, plate-shaped locking part, which is held on the top rail and, in a locking position, blocks a movement of the top rail in the bottom rail. In this case, the bottom rail can have apertures, while the top rail is provided with openings, and the locking part carries projections on its two opposite longitudinal sides, which projections are movable by a spring both into the openings and into the apertures in the locking position. A longitudinal seat-adjustment device of this kind is known from WO 2023/281380 A1, for example.

The problem to be solved by the invention is that of improving a longitudinal seat-adjustment device of the type stated at the outset, in particular that of providing a longitudinal seat-adjustment device which is as quiet as possible, even in a locked state, and a corresponding vehicle seat.

SUMMARY

According to the invention, the first-mentioned problem is solved by means of a longitudinal seat-adjustment device having the features of claim 1. According to the invention, the problem mentioned second is solved by means of a vehicle seat having the features of claim 10.

The longitudinal seat-adjustment device according to the invention comprises at least one rail arrangement having at least one rail pair and at least one locking element, wherein the rail arrangement is formed from a top rail and a bottom rail, which are movable relative to one another, wherein the at least one locking element is held in a spring-loaded and movable manner on the top rail and blocks a movement of the top rail in the bottom rail in a locking position, and enables a movement in an unlocking position, and wherein an additional lock is provided, which interacts with the locking element in the locking position in such a way that a movement of the locking element in at least one spatial direction, e.g. in the height direction or vertical direction, in particular in the actuating direction and/or perpendicularly to the locking direction, is at least limited, inhibited or blocked.

The vehicle seat according to the invention comprises such a longitudinal seat-adjustment device.

The core of the invention is the locking element in combination with the additional lock at least for the locking element and optionally also for the actuating element. In particular, the locking element is designed as a single-plate lock. On one side, the locking element can lock a top rail (also referred to as a slider or slide) to the bottom rail. On account of their non-self-locking angle of obliquity, play-eliminating locking teeth of the locking element drive the locking element in a transverse direction, in particular Y direction, out of its locking position against a stop element counter to a spring force when there is an overload, e.g. due to an accident. In this case, the locking teeth still engage in the locking receptacles or latching openings (also referred to as a hole pattern) of the top rail and the bottom rail, which are each designed as a U profile (also referred to as a U bracket), for example. In this way, the top rail and the bottom rail remain locked. When the rail arrangement is unlocked, the locking element can, in turn, be pushed under the stop element against the spring force and can then be pulled sideways fully out of the locking receptacles at least in the bottom rail, thus allowing longitudinal adjustment of the top rail relative to the fixed bottom rail.

In the case of the locking element designed as a single-plate lock, there can be a risk that, on account of high stresses on the rail arrangement, in particular accelerations in the height direction or vertical direction (also referred to as the z direction), such as those which may occur in a crash, or on account of momentum occurring in a crash, introduced via contact points of the locking element, in particular locking teeth, a rotation of the locking element about an axis, in particular about an axis in the longitudinal direction (also referred to as the X axis), may occur. In this case, a spring force of a spring in contact with the locking element, in particular the locking spring, could be easily overcome and lead to movement, in particular lowering, of the locking element below the stop element. The locking could thereby be released, and therefore reliability of locking would not be guaranteed.

To avoid this, the invention provides the additional lock, which limits or inhibits the movement of the locking element in the vertical direction or height direction (=Z movement) and/or perpendicular to the locking direction, e.g. downward, in such a way that the locking element is always stopped or blocked against the stop element, in particular in the form of a counter stop, in particular always rests against the stop element or is stopped or blocked counter to the locking direction, e.g. toward the inside in the transverse direction or in the y direction. In particular, the additional lock and the locking element are configured in such a way and interact in such a way that when unwanted forces act on the locking element, e.g. large acting forces, such as those in an accident, in particular in the longitudinal direction, the locking element remains or is held at such a height (also referred to as stop height) in the vertical direction by means of the additional lock that a rear side of the locking element always rests against the stop element and is thus stopped by the latter.

In addition, the actuating element can be held in an unactuated position by means of the additional lock. This additional lock can be released and freed only by the actuation of the unlocking means, in particular an actuating element, in the unlocking direction, e.g. downward in the vertical direction and thus in the z direction.

For example, the locking element can be preloaded in the locking direction by means of the additional lock in the locking position. In this case, the locking element is pressed and thus held under a preload in the locking direction by means of the additional lock, e.g. directly and/or indirectly via an actuating element. In other words: the additional lock is configured, on the one hand, to press the locking element, in particular by means of a spring leg, into the locking receptacle, in particular onto a lower edge of the locking receptacle and perpendicularly to the locking direction, and, on the other hand, to press the locking element in the locking direction into the locking receptacle and hold it under a preload, in particular by means of a further spring leg.

In particular, the additional lock can interact with the locking element in the locking position in such a way that a movement of the locking element is limited or inhibited or blocked. For example, the additional lock can interact with the locking element in the locking position in such a way that a movement of the locking element perpendicular to the locking direction is limited or blocked. Moreover, the additional lock can, for example, limit or block the movement, in particular a lateral movement or lateral displacement, of the locking element in the locking position thereof in such a way that the locking element rests against a stop element, in particular additionally is held in a form-fitting and/or force-fitting manner.

For example, the additional lock can comprise at least one bearing portion, at least one locking portion and at least one control portion. In particular, the additional lock can be designed as a locking wire with multiple bends. For example, on the one hand, the additional lock can in this case rest against the actuating element, in particular under a spring preload, and, on the other hand, can be mounted on a bearing unit and optionally rest under a spring preload against the locking element.

A locking spring can also be provided which holds the locking element without play e.g. under a spring preload, in its locking position. After unlocking, the locking element is pressed back in the locking direction and thus brought into the locking position, e.g. by means of the locking spring, which is designed as a return spring for example.

DESCRIPTION OF THE FIGURES

The invention is explained in greater detail below with reference to advantageous exemplary embodiments illustrated in the figures. However, the invention is not restricted to these exemplary embodiments. Of the figures.

DETAILED DESCRIPTION

Figure 1:
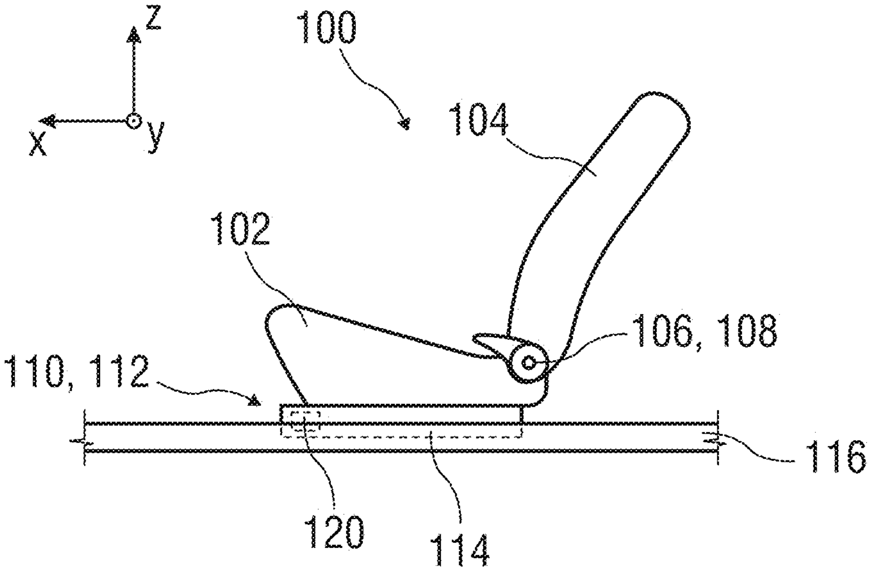
FIG. 1: shows, in a schematic illustration, a vehicle seat having a longitudinal adjustment device according to the prior art.

In all the figures, mutually corresponding parts are provided with the same reference signs.

A vehicle seat 100 illustrated schematically in FIG. 1, which relates to the prior art, is described below using three spatial directions perpendicular to one another. In the case of a vehicle seat 100 installed in the vehicle, a longitudinal direction x runs largely horizontally and preferably parallel to a vehicle longitudinal direction, which corresponds to the normal driving direction of the vehicle. A transverse direction y, which runs perpendicularly to the longitudinal direction x, is likewise aligned horizontally in the vehicle and runs parallel to a vehicle transverse direction. A vertical direction z runs perpendicularly to the longitudinal direction x and perpendicularly to the transverse direction y. With the vehicle seat 100 installed in the vehicle, the vertical direction z preferably runs parallel to a vehicle vertical axis.

The position indications and direction indications used, such as front, rear, top and bottom, refer to a direction of view of an occupant sitting in a normal sitting position in the vehicle seat 100, wherein the vehicle seat 100 is installed in the vehicle, in a use position suitable for carrying people, with the seat back 104 upright, and is oriented in the usual manner in the direction of travel. However, the vehicle seat 100 can also be installed or moved in a different orientation, e.g. transversely to the direction of travel. Unless otherwise described, the vehicle seat 100 is constructed in mirror symmetry with respect to a plane running perpendicularly to the transverse direction y.

The seat back 104 can be arranged pivotably on a seat part 102 of the vehicle seat 100. For this purpose, the vehicle seat 100 can optionally comprise a fitting 106, in particular an adjustment fitting, rotation fitting, latching fitting or tilt fitting.

The position indications and direction indications used, such as radial, axial and in the circumferential direction, refer to the axis of rotation 108 of the fitting 106. Radial means perpendicular to the axis of rotation 108. Axial means in the direction of or parallel to the axis of rotation 108.

The vehicle seat 100 can comprise a longitudinal adjustment device 110. The longitudinal adjustment device 110 comprises, for example, a rail arrangement 112 having a first rail element 114 and a second rail element 116. The first rail element 114 is adjustable relative to the second rail element 116 in the longitudinal direction x. The first rail element 114 is secured on the seat part 102. The second rail element 116 is secured on a structural element of a vehicle, e.g. a vehicle floor.

For greater clarity, the first rail element 114 is referred to as the top rail 114 in the following description. This top rail 114 (also referred to as a running rail or slide) is assigned to the vehicle seat 100 and configured to support this vehicle seat 100. The second rail element 116 is referred to below as the bottom rail 116. The bottom rail 116 is connected in a fixed manner and by way of example to the floor of a vehicle.

The longitudinal seat-adjustment device 110 furthermore comprises at least one locking element 120. In this case, each rail arrangement 112, designed as a rail pair, can comprise an associated locking element 120, as described in greater detail below with reference to FIGS. 2 to 14.

Figure 2:
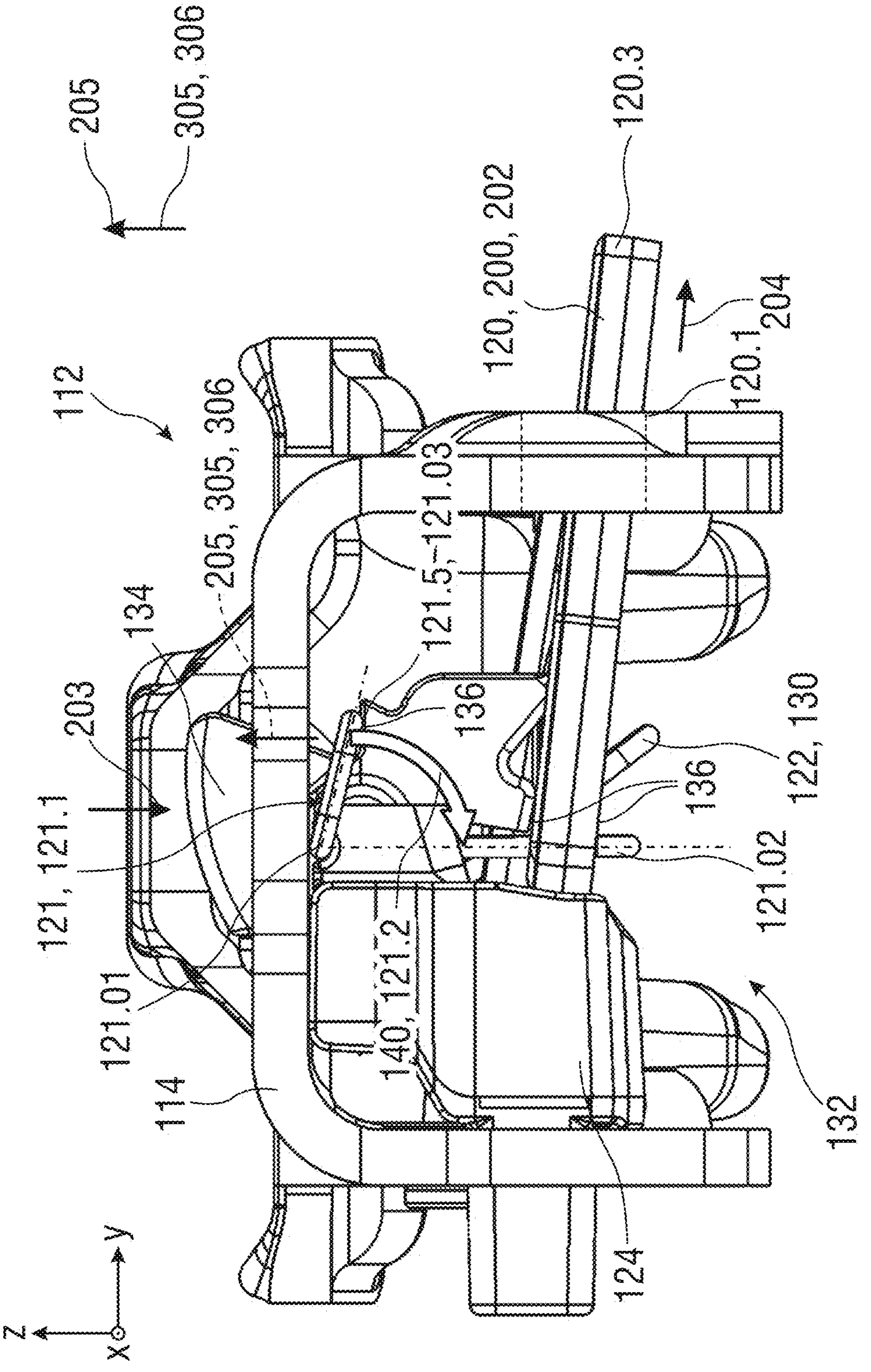
FIG. 2: shows a plan view of the end of a top rail with a locking element of the rail assembly of the longitudinal adjustment device.

FIG. 2 shows a plan view of the end of the top rail 114 with the locking element 120 according to the prior art as per WO 2023/281380 A1 in a locking position 200.

The locking element 120 is designed as a double lock. For the purposes of the invention, a double lock is understood to mean, in particular, that, in the locking position 200, the locking element 120 on the one hand blocks a movement of the top rail 114 (also referred to as a rail runner) relative to the bottom rail 116 (also referred to as a guide rail) and on the other hand at least limits, inhibits or blocks unwanted movements of the locking element 120 in the locking position 200 by means of a locking spring 122 and/or a stop element 124 and/or an additional lock 121.

The lock element 120 can be designed, for example, as a locking plate, in particular as a single separate locking plate, which can lock the top rail 114 to the bottom rail 116. The locking element 120 is also referred to as a single-plate lock.

The at least one locking element 120 is spring-loaded and held movably on the top rail 114, in particular being mounted rotatably and movably, in particular being adjustable or movable in an arc by means of a combined rotary and pulling movement.

The locking element 120 is, in particular, a single locking plate. The locking element 120 is configured to lock the top rail 114, e.g. on one side, to the bottom rail 116. For this purpose, the locking element 120 can be provided, e.g. on one of its longitudinal sides, in particular on one side, with locking teeth 120.3. The locking teeth 120.3 project from the locking plate in the transverse direction y in the direction of side walls of the top rail 114 and of the bottom rail 116 and, in the locking position 200, into corresponding locking receptacles 126 (illustrated in FIG. 4).

Locking teeth 120.3, in particular locking teeth 120.3 of the locking element 120 which eliminate play, can have oblique side walls on their longitudinal sides or a trapezoidal shape. By virtue of this angle of obliquity, in particular a non-self-locking angle of obliquity, on their longitudinal sides, the locking teeth 120.3 can drive the locking element 120 out of locking situations or locking positions 200 in transverse direction y, counter to the spring force of the locking spring 122, when there is an overload and, in particular, can strike against the stop element 124.

During this process, the locking teeth 120.3 can engage in the locking receptacles 126 of the top rail 114, in particular in a hole pattern in the top rail 114, and in the locking receptacles 126 of the bottom rail 116 (not illustrated). The top rail 114 and the bottom rail 116 can each be designed as U-shaped profiles or brackets. In this way, the top rail 114 and the bottom rail 116 remain locked. When the rail arrangement 112 is unlocked, the locking plate can, in turn, be moved, in particular pushed, under the stop element 124 against the spring force and then moved, in particular pulled, sideways fully, at least out of the locking receptacles 126 (illustrated in FIG. 4), e.g. the hole pattern, at least of the bottom rail 116, thus allowing longitudinal rail adjustment.

The stop element 124 is arranged in a cavity 132 formed between the top rail 114 and the bottom rail 116. The stop element 124 is, in particular, secured on the top rail 114. The stop element 124 is preferably secured by material bonding, e.g. welded, on the top rail 114. Alternatively, the stop element 124 can be connected by a form fit and/or a force fit to the top rail 114.

The locking element 120 is, for example, guided directly in the latching openings or locking receptacles 126 of the top rail 114, in particular during a movement, in particular pivoting, of the locking element 120 into the locking position 200. During an unlocking movement out of the locking position 200 into an unlocking position 218 (illustrated in FIG. 6), the locking element 120 is unlocked by an actuating element 134, with control being exercised by means of a combined rotary and pulling movement. In other words: the unlocking movement of the locking element 120 is carried out by actuation of the actuating element 134 in the actuating direction 203 and transmission of this actuating movement to the locking element 120 in order to unlock the latter and put it into the unlocking position 218 (shown in FIG. 6).

In the unlocking position 218, the locking element 120 has been moved at least out of the second locking receptacles 126 of the bottom rail 116, thus allowing the top rail 114 to be moved relative to the bottom rail 116. Owing to its rotary and pulling movement, the locking element 120 does not have a defined axis of rotation.

Moreover, the locking spring 122 can, in particular, be designed as a return element 130, e.g. as a return spring. During the unlocking process, the return element 130 is put under stress. When the unlocking force is removed, the return element 130 relaxes, with the result that the locking element 120 is automatically returned to the locking position 200 by means of the return element 130. In this case, the return element 130, in particular the spring force thereof, can be configured in such a way that it presses the locking element 120 into the locking position 200. In other words: the locking element 120 is placed, in particular pressed, into the locking position 200 under a spring load, with the result that the top rail 114 and the bottom rail 116 are arranged without play relative to one another. In particular, the top rail 114 and the bottom rail 116 are in this case preloaded in the locking position 200 relative to one another by means of the spring-loaded locking element 120.

In particular, the locking element 120 is arranged and configured in such a way that, during unlocking, it is first of all rotatable over a certain range in the locking position 200 and is then actuable, in particular movable or capable of being pulled linearly or in an arc, out of the locking position 200 into the unlocking position 218.

In the locking position 200, the locking element 120 is, for example, held in the transverse direction y by a force fit, in particular a frictional fit, and held preloaded in the vertical direction z. In particular, the locking element 120 locks the top rail 114 and the bottom rail 116 in the longitudinal direction x.

To unlock the locking of the top rail 114 and the bottom rail 116, the respective locking element 120 is first of all movable in the longitudinal direction x out of force-fitting retention by means of rotation about an axis of rotation in the locking position 200, in particular is rotatable into an intermediate position and then movable, in particular capable of being pulled, out of the locking position 200 into the unlocking position 218 by means of the linear or arcuate movement.

The sequence of motion during unlocking or locking with a simple tension-catch function for the locking element 120 without additional components through the use of a combined movement of the locking element 120 comprising a rotary movement and a pulling movement takes place in a manner analogous to the disclosure in prior publication WO 2023/281380 A1, to which reference is made in this connection.

In comparison with this publication, the present locking element 120 comprises a modified and, in particular secured, locking location 202 in the locked situation and thus in the locking position 200. This is achieved by means of the locking spring 122 and the additional lock 121 according to the invention.

In particular, the additional lock 121 can be designed as a locking wire 121.1 with multiple bends. The additional lock 121 is, in particular, configured to limit, inhibit or block a movement of the locking element 120 in at least one spatial direction, in particular in the vertical direction z or height direction (also referred to as a vertical direction of movement), and, in particular, to provide or perform a Z locking function in the vertical direction z or perpendicular to a locking direction 204. Thus, the additional lock 121 secures the locking element 120 in its locking position 200 against movements in the vertical direction z.

The additional lock 121 can be designed as a wire spring with a predetermined spring torque 121.2 and a predetermined preloading angle 140.

The locking spring 122 presses the locking element 120 into the locking receptacles 126 of the top rail 114 and of the bottom rail 116 (illustrated in FIG. 1). Furthermore, the locking spring 122 exerts an upward locking force 305 in the vertical direction z against the locking element 120 and/or in the locking direction 204 in order to press this locking element 120 against the actuating element 134, which is designed, for example, as an actuating lever, e.g. at a contact point 136, or into the locking receptacle 126 and, in particular, to hold it there under a preload. During unlocking, an actuating force 302 is exerted on the actuating element 134 in the actuating direction 203.

Figure 4:
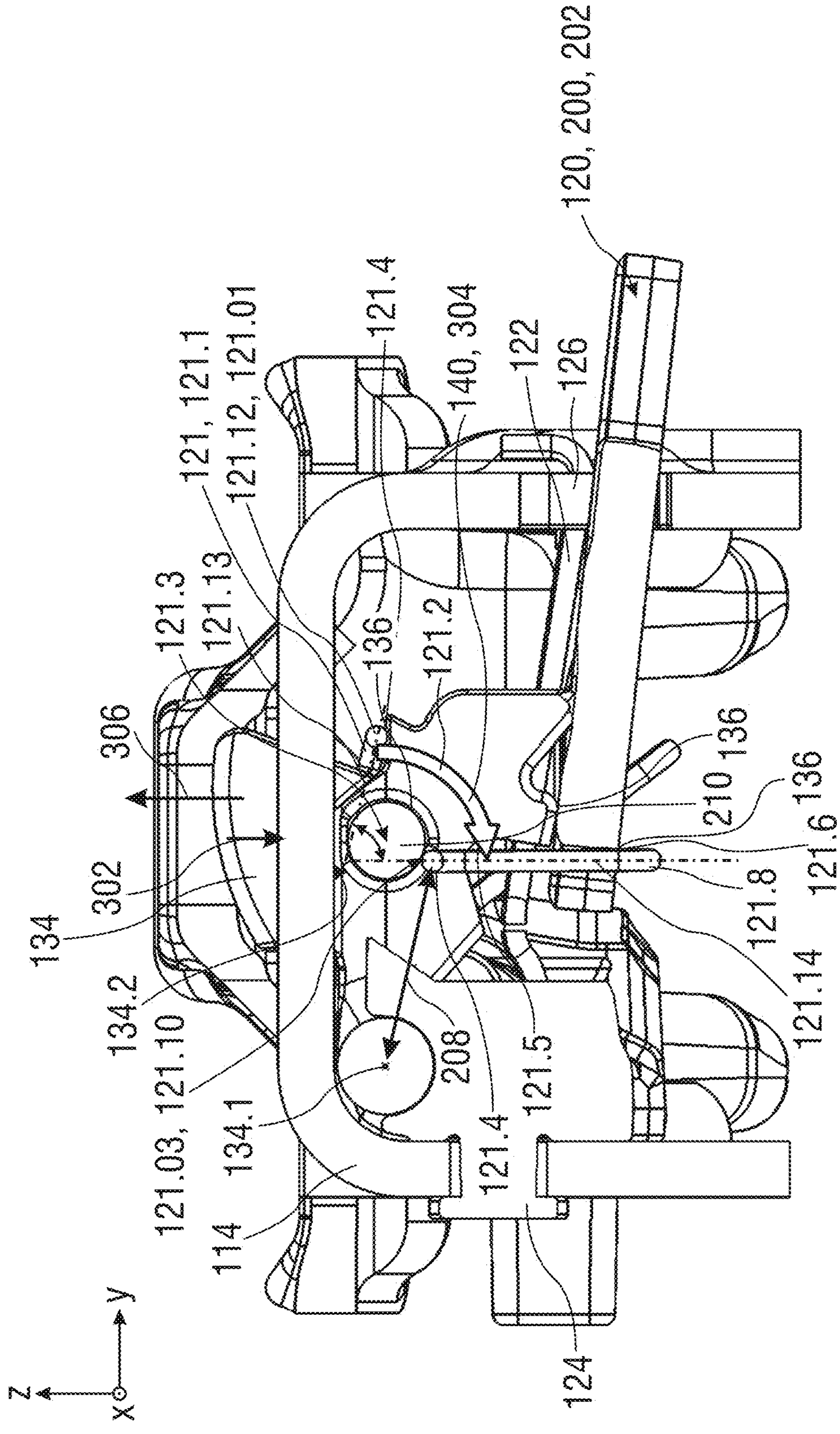
FIG. 4: shows a section through the top rail with locking element.

In particular, the actuating element 134 is mounted on the top rail 114 in such a way as to be rotatable about a bearing axis 134.1 (illustrated in FIG. 4). The actuating element 134 can comprise an end stop 134.2 (illustrated in FIG. 4), which, for example, defines the locking location 202 of the locking element 120 toward the top in the vertical direction z in the locking position 200 of the rail arrangement 112 (illustrated in FIG. 1). In its locking position 200, the locking element 120 furthermore has an abutment point 120.1, which defines the locking location 202 of the locking element 120 toward the bottom in the vertical direction z in the locking position 200.

The additional lock 121 is configured to hold the locking element 120 in a manner preloaded in the locking direction 204 in the locking position 200. For example, the additional lock 121, in particular its kinematics and/or shape, in particular its multiple-bend shape with free projecting spring ends 121.12, is configured in such a way that this additional lock 121 is reliably below the locking element 120 and its spring effect presses against the locking element 120 in the locking direction 204, with the result that this locking element 120 is held under a preload in the locking receptacle 126 in the locking position 200. In particular, the additional lock 121 interacts with the locking element 120 in the locking position 200 in such a way that a movement of the locking element 120 in the vertical direction z and thus perpendicular to the locking direction 204 is limited, inhibited or blocked.

In addition, the additional lock 121 can limit or inhibit movements, in particular vertical movements (=movements perpendicular to the locking direction 204) and/or sideways movements (=movements counter to the locking direction 204), of the locking element 120 in the locking position 200 thereof in such a way that the locking element 120 always rests against the stop element 124 if relatively high longitudinal loads on the top rail 114 (also referred to as a slider) are driving the locking element 120 out of the locking receptacles 126 counter to the locking direction 204.

The additional lock 121, which is designed as a formed bent wire part for example, can comprise, for example, at least one bearing portion 121.01, at least one locking portion 121.02 (illustrated in FIG. 2) and at least one control portion 121.03 (illustrated in FIG. 4).

In this case, the additional lock 121, in particular the spring force thereof (also referred to as an additional force), can be configured in such a way that it presses the locking element 120 in the locking direction 204. In other words: the locking element 120 is pressed under a spring load in the locking direction 204, with the result that a movement of the locking element 120 out of the locking position 200 is limited, inhibited or blocked.

Contact points 136 (illustrated in FIGS. 2 and 4) of the additional lock 121, in particular a contact point 136 of a control portion 121.03 (also referred to as control wire portion 121.5) on/with the actuating element 134, in particular on/with the bolt 121.3 (also referred to as a pin), ensure that the spring force is applied to the actuating element 134 by the additional lock 121. Furthermore, the contact points 136 serve for the pivoting of the additional lock 121 during the actuation of the actuating element 134. For example, the contact point 136 with the locking element 120 presses the latter downward in the initial phase of actuation of the actuating element 134.

In other words: in the locking location 202, a spring torque 121.2 is generated via the contact point 136 of the control portion 121.03 on the actuating element 134 (as illustrated in FIG. 4), and this torque acts on the actuating element 134 and presses it in the direction indicated by arrow 205 (also referred to as additional locking force 306 in the direction counter to actuation). That is to say that, even without the locking element 120 and its spring action, the actuating element 134 is held in an unactuated position and pressed upward as indicated by arrow 205 by means of the additional lock 121. A movement counter to arrow 205 is inhibited or blocked or limited after a defined idle stroke in order to ensure that the locking element 120 can always engage or strike against the stop element 124 (also referred to as an end stop).

In particular, the additional lock 121 and the locking element 120 are configured in such a way and interact in such a way that when unwanted forces act on the locking element 120 in the longitudinal direction (x), the locking element 120 remains or is held at such a height in the vertical direction z by means of the additional lock 121 that a rear side 120.4 (illustrated in FIG. 5) of the locking element 120 always rests against the stop element 124 or is stopped by the latter.

Figure 3:
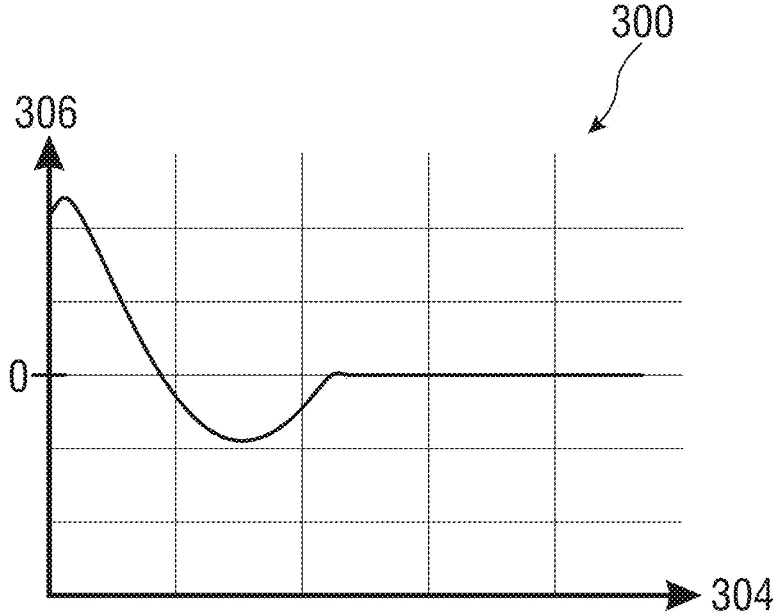
FIG. 3: shows a force-angle diagram for an actuating element for the locking element.

FIG. 3 shows a force-angle diagram 300, in particular a diagram which illustrates the functional relationship between the additional locking force 306 (=additional force of the additional lock 121, which acts on the actuating element 134, illustrated in FIG. 2) and the locking angle 304 (=preloading angle 140 of the actuating element 134 (also referred to as an unlocking element), illustrated in FIG. 2) of the additional lock 121 for securing the locking location 202 of the locking element 120 in its locking position 200 by means of the additional locking force 306 provided by the additional lock 121.

The additional locking force 306, which is illustrated as being greater than zero in the force-angle diagram 300, in particular of the control portion 121.03 (illustrated in FIGS. 2 and 11), brings about an active spring action of the actuating element 134. That is to say that, even if the spring force of the locking spring 122 is no longer acting, the actuating element 134 and the additional lock 121 designed as a locking wire 121.1 are themselves held in position. Thus, the locking wire 121.1 remains reliably below the locking element 120. In other words: the spring action serves to secure the locking location 202 of the additional lock 121 below the locking element 120.

By means of the additional lock 121, it is ensured that a movement of the locking element 120 in the vertical direction z is limited or blocked to such an extent that the locking element 120 always rests against the stop element 124 in the transverse direction y or is prevented or stopped from moving by the latter. Only by unlocking the locking element 120 and thus guiding the actuating element 134 out in the actuating direction 203 and thus in the unlocking direction can the additional lock 121 be opened or unlocked. In this case, the negative additional locking force 306 must be overcome by the force of the conventional locking spring 122. Therefore, the additional locking force 306 provided must not be too high to allow re-locking. The locking spring 122 and the additional lock 121 work against one another over the rotation angle in the negative force range of the additional locking force 306.

FIG. 4 shows a section through the top rail 114 with the locking element 120, the locking spring 122 and the additional lock 121 in the form of the locking wire 121.1.

The locking kinematics of the locking element 120 are described in greater detail below with reference to FIGS. 3 and 4:

A spring torque 121.2 of the locking wire 121.1, which is provided with a preload in the locking position 200, ensures an additional locking force 306 (illustrated in FIG. 3) on the actuating element 134.

This spring torque 121.2 occurs over a preloading angle 140, which is formed between the first contacts or contact portions of the locking wire 121.1, in particular the bearing portion 121.01 on the spring end 121.12 and/or spring leg portion 121.13, to the surface on the actuating element 134, designed as an actuating lever, and second contacts, in particular control portions 121.03 (also referred to as control cam 121.10). The enclosed angle 140 (also referred to as the preloading angle or locking angle 304/additional locking angle) between the spring leg portion 121.13 and the vertical wire portion 121.7 of the additional lock 121 is smaller when the spring is not installed, and therefore the spring is preloaded during or in the installed state (FIG. 4). As a result, the actuating element 134 is pressed against an upper stop surface 124.1 of the stop element 124 in accordance with arrow 205, and the locking portion 121.02 is held in position or pressed against the locking element 120 in the locking direction 204 in accordance with the preloading angle 140. This ensures that the additional lock 121 is always held securely below the locking element 120.

Figure 10:
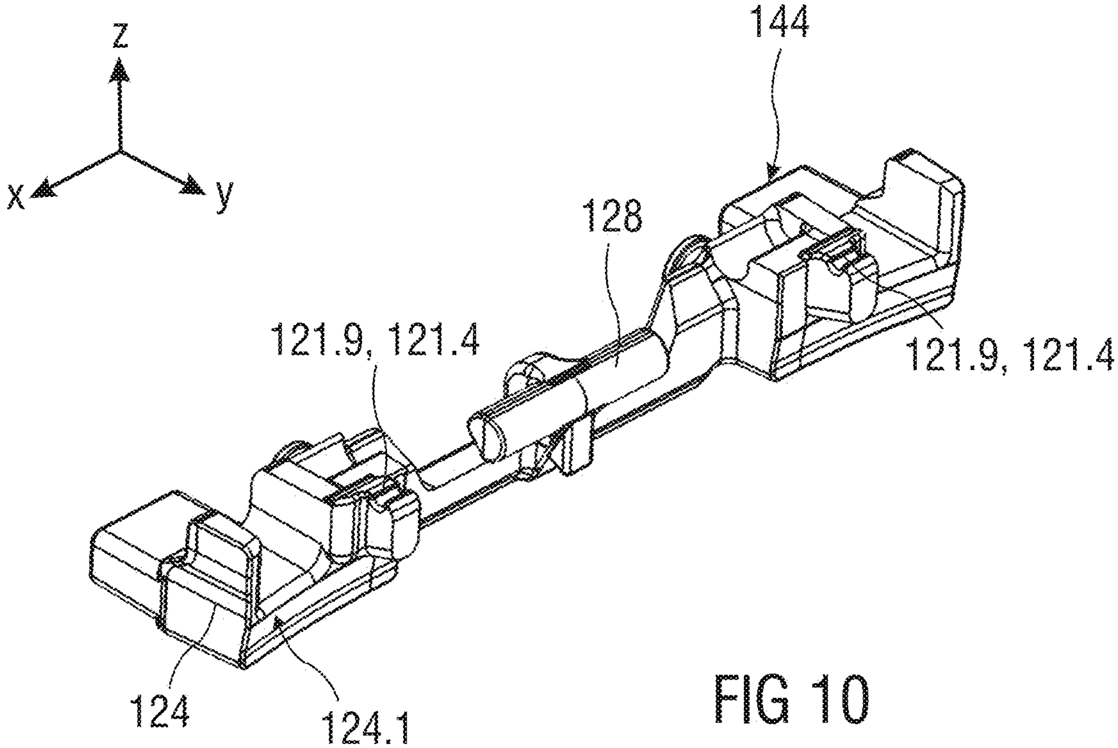
FIG. 10: shows a perspective view of the bearing location of a locking spring and of an additional lock for the locking element.
Figure 11:
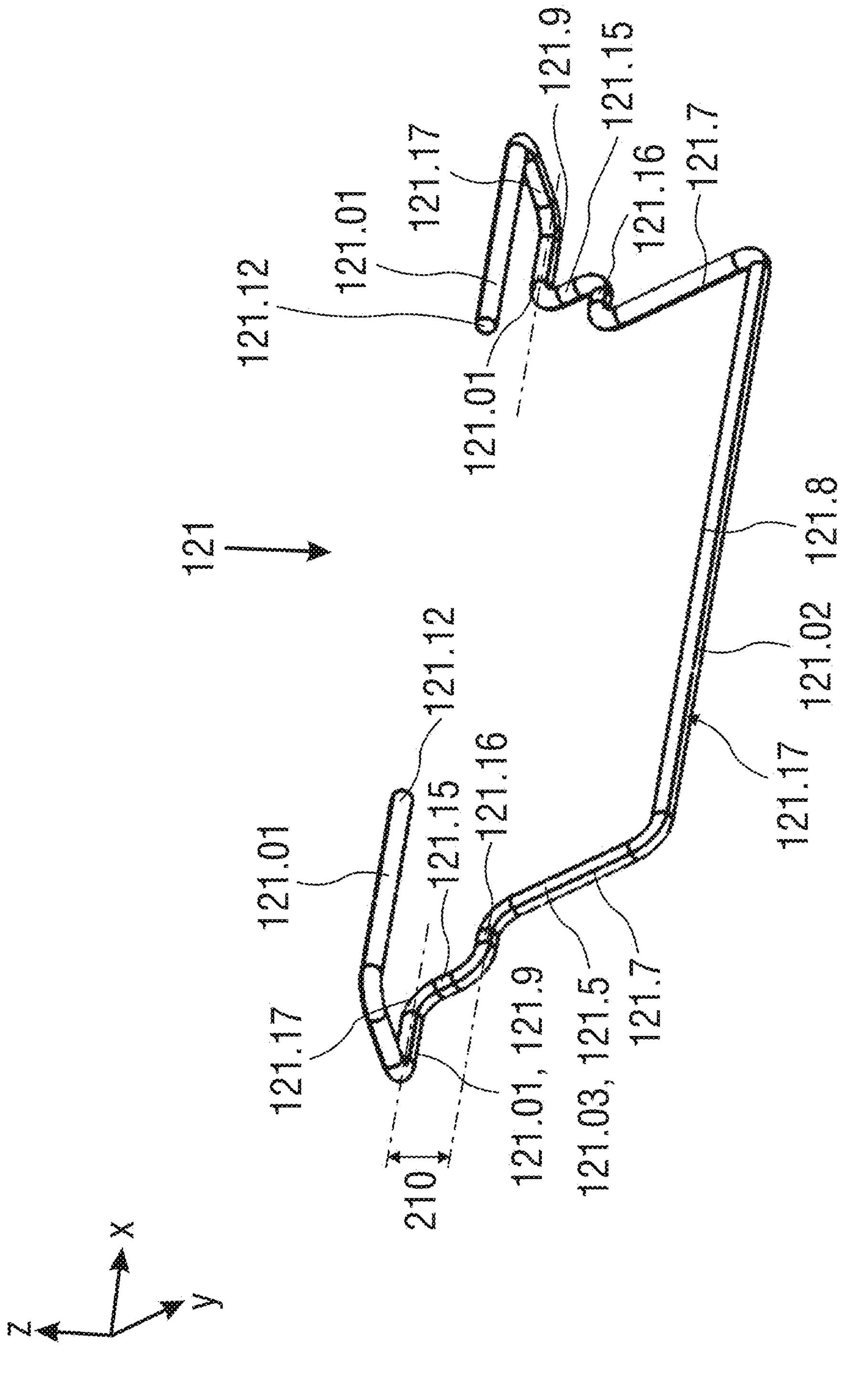
FIG. 11: shows a perspective view of the additional lock.

The locking wire 121.1, in particular its bearing portion 121.01 with spring ends 121.12 (illustrated in FIG. 11), is mounted on bearing contact points 121.4 of a bearing unit 144 (illustrated in FIG. 10) in such a way as to be rotatable about an axis of rotation 121.9 (illustrated in FIG. 11).

Figure 6:
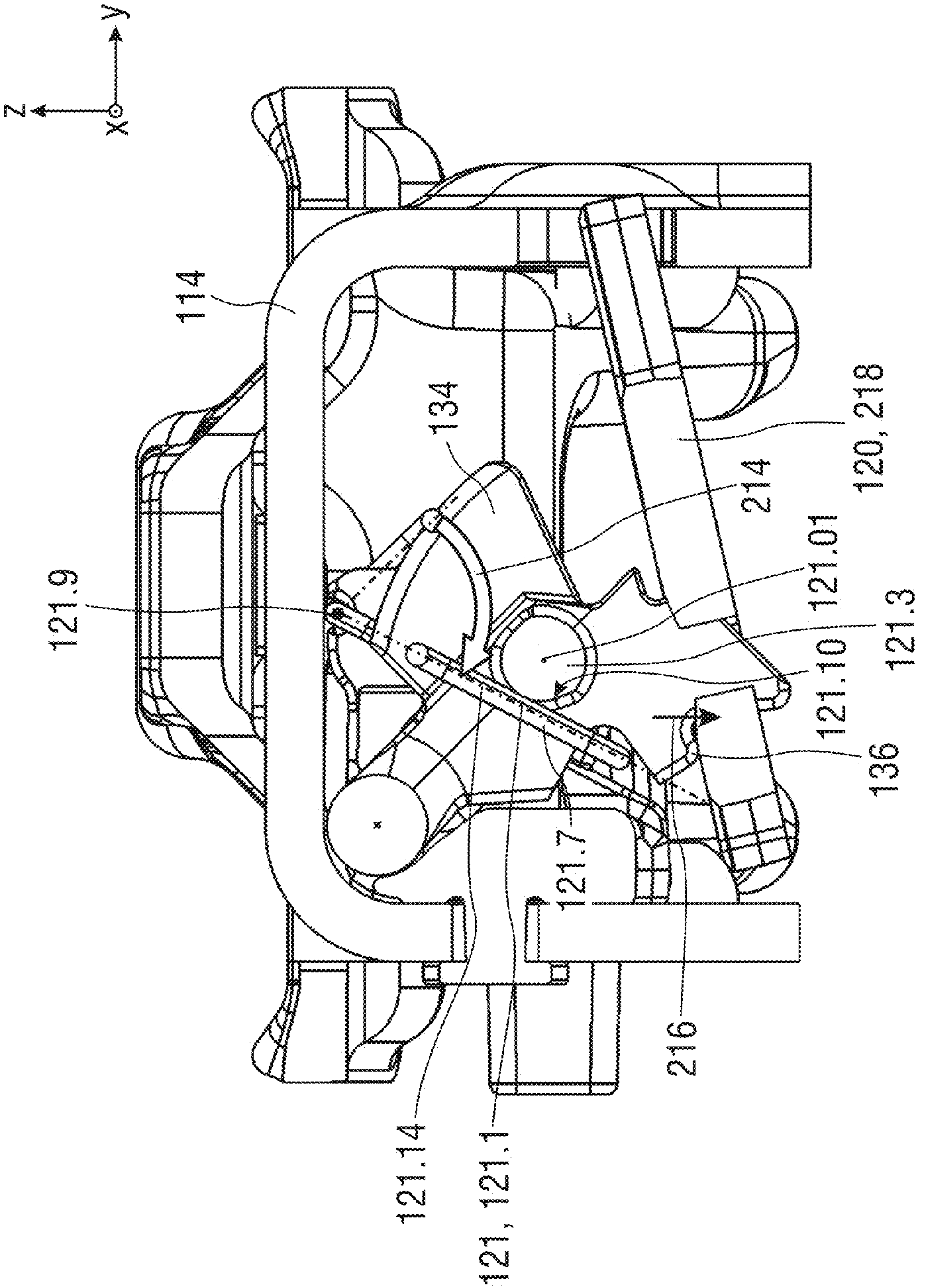
FIG. 6: shows another section through the top rail with locking element.

In addition, a bolt 121.3, in particular a control pin, is provided, on which the control portion 121.03 of the additional lock 121, in particular the vertical wire portions 121.7 designed as control wire portions and the control radii 121.16 of the locking wire 121.1 with a control pin cam, is in engagement, depending on the deflection of the additional lock 121. In the locking position 200, the bearing contact point 121.6 (illustrated in FIG. 4) is initially in contact with the control pin. If the unlocking movement is then continued, the control pin (bolt 121.3) slides along the leg (vertical wire portion 121.7), as illustrated in FIG. 6.

In the locking position 200, the first contact of the locking wire 121.1 with the actuating element 134 is preferably not via the bearing contact point 121.4 in the region of the control wire portion 121.5 with the control pin cam but via a further bearing contact point 121.6 of the locking wire 121.1, at least one vertical wire portion 121.7 (illustrated in FIGS. 7 and 11) and/or a connecting web 121.8 (illustrated in FIG. 11) of the locking region with the locking element 120.

In addition, the connecting web 121.8 will always lie below the locking element 120, irrespective of tolerances.

A pivot point 121.9 (illustrated in FIGS. 5 to 7) is preferably arranged above the connecting web 121.8 in order to prevent an opening torque in the actuating direction 203 (illustrated in FIG. 2) by means of the locking wire 121.1 in the event of sudden instances of lowering of the locking element 120, e.g. in the event of an accident.

When the longitudinal adjustment device 110 is unlocked (illustrated in FIG. 1), an actuating force 302 is impressed on the actuating element 134 in the region of the additional locking force 306 of the locking wire 121.1. The actuating element 134 then rotates about the bearing axis 134.1. A first distance 208 (also referred to as a lever arm) between this bearing axis 134.1 and a first control cam 121.10 of the bolt 121.3 (also referred to as a control pin) is large in comparison with a second distance 210 (also referred to as a lever arm) of a control radius 121.16 (also referred to as a further control wire portion, illustrated in FIG. 11) of the locking wire 121.1 from its axis of rotation 121.9.

These lever ratios, together with the contact angle of the first control cam 121.10, ensure more rapid pivoting of the locking wire 121.1 about the axis of rotation 121.9 than of the actuating element 134. Thus, a supporting surface on the further bearing contact point 121.6 is lowered less quickly than the spring end 121.12 (illustrated in FIG. 11) of the locking wire 121.1, which spring end rests on said surface.

An angle, in particular the preloading angle 140, between the spring leg portions 121.13 and the vertical wire portion 121.7 is enlarged, wherein the additional lock 121, in particular the flexible locking wire 121.1 in the form of an additional locking spring, is further stressed in this range. This results in a torque profile and thus a force profile of the actuating force 302 on the actuating element 134 during unlocking as illustrated in the force-angle diagram 300.

Here, positive forces indicate that a connecting web 121.8 designed as a locking web always presses or is pressed against the locking element 120 by means of the additional locking force 306, and remains below it, and also that the actuating element 134 is held in position, in particular in an unactuated position, by a resultant force.

Figure 5:
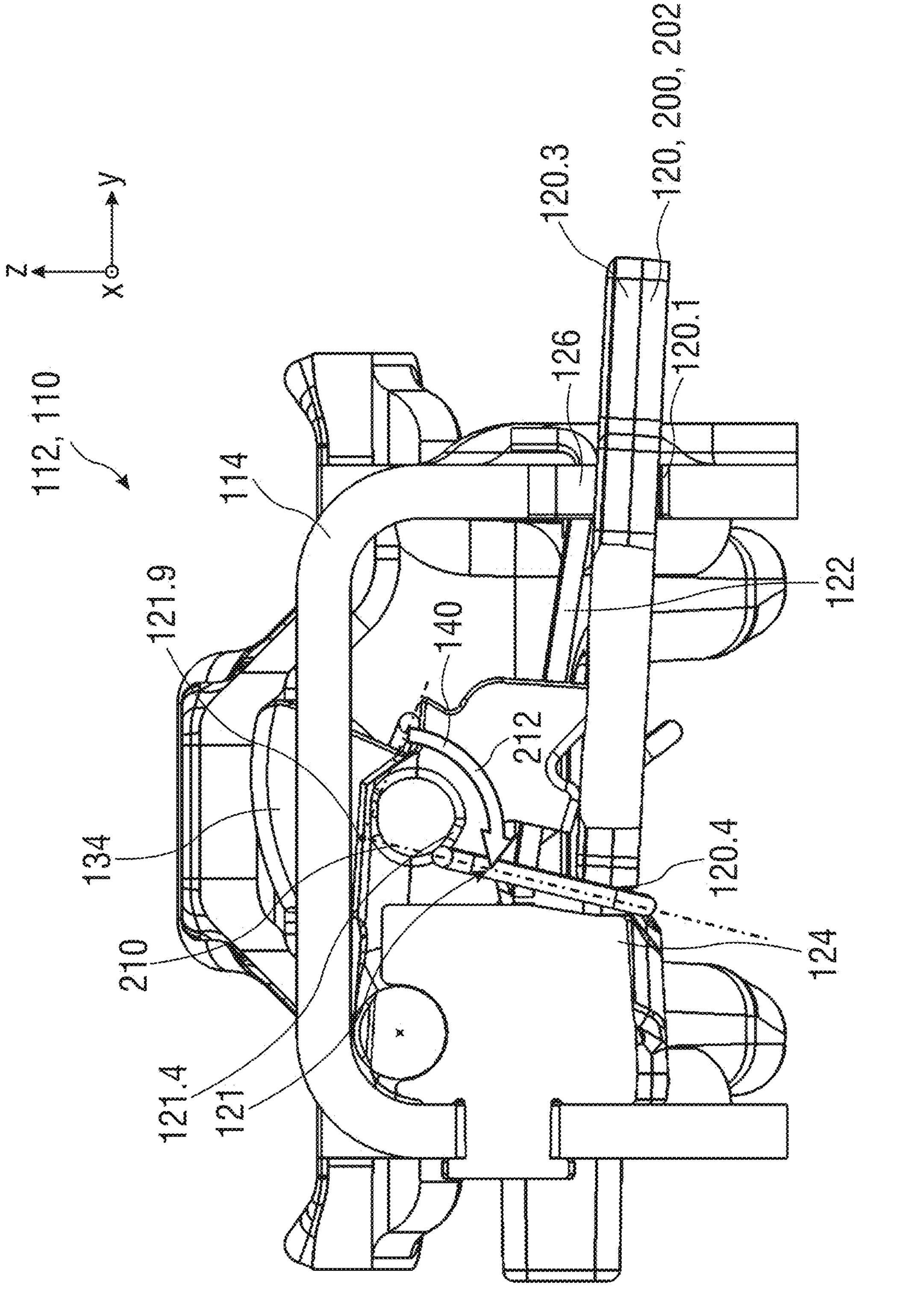
FIG. 5: shows another section through the top rail with locking element.

FIG. 5 shows another section through the top rail 114 with the locking element 120. FIG. 5 shows another state of the preloading angle 140 of the locking wire 121.1 in accordance with arrow 212. In the force-angle diagram 300 mentioned above, this state is represented by the transition from positive values to negative values of the additional locking force 306.

The rear side 120.4 (also rear edge or rear-side edge) of the locking element 120, which rear side faces the stop element 124, is substantially at the same height as the stop element 124. In this case, the locking element 120 is pressed, in particular pushed, against the stop element 124 by forces which lead to lateral disengagement forces on the play-eliminating non-self-locking tooth flanks of the locking teeth 120.3. In this case, the locking teeth 120.3 remain both in the locking receptacles 126 of the bottom rail 116 and those of the top rail 114.

In the exemplary embodiment with the selected spring force and a given mass of the locking element 120, accelerations greater than 22 times gravitational acceleration can lead, for example, to a movement, in particular in the vertical direction z of the locking element 120, counter to a locking force, in particular a spring force, of the locking spring 122, in particular of a locking wire spring.

In addition, FEA calculations have shown that abutment points 120.1 of the locking element 120 with the top rail 114 and the bottom rail 116 may lead to the initiation of a rotation of the locking element 120 about an axis in the longitudinal direction x (also referred to as the X axis).

To avoid such a rotation in the locking position 200, the locking wire 121.1 is provided and secures the locking location 202 of the locking element 120 in the locking receptacle 126. In particular, the locking wire 121.1 secures the stop height of the locking element 120, such that the stop surface 124.1 of the locking plate can be stopped against the stop element 124.

Here, the above-described lever ratios, formed, in particular, by the distances 208, 210 (illustrated in FIG. 4) and the control cam geometry, in particular the control cam 121.10 of the bolt 121.3 designed as a control pin are matched in such a way that the locking wire 121.1 pivots more quickly in accordance with arrow 214 than the locking element 120 is pressed down in accordance with arrow 216 (illustrated in FIG. 6) via the contact point or points 136 of the actuating element 134. The bolt 121.3 designed as a control pin can have a circular main control cam and a bevel for the locking location 202 in the locking position 200.

Lowering the locking element 120 below the level of the stop element 124 is only possible if the additional lock 121, in particular the locking wire 121.1 has been pivoted away below the locking element 120.

A rotation angle change of the locking wire 121.1 about the axis of rotation 121.9 is designed, in particular, in such a way that this initially takes place very quickly and finally, only for pivoting into its end position, significantly more slowly.

A loading angle in accordance with arrow 214 of the locking wire 121.1 is reduced again in the further progress of the actuating stroke of the actuating element 134 until the transition to a negative force is reached, as shown in the force-angle diagram 300 in FIG. 3. During this process, spring energy is transferred to the spring lever, in particular the vertical wire portion 121.7, as a result of which the latter is briefly accelerated. In the fully unlocked situation, there is no additional spring effect present. This can be ascertained from the fact that (as illustrated in FIG. 6) there is no contact with the further bearing contact point 121.6 (illustrated in FIG. 4). During relocking, the locking wire 121.1 is taken along again at the further bearing contact point 121.6 in the direction of the initial position by inter-engagement of the vertical wire portion 121.7 at the further bearing contact point 121.6 of the locking element 120.

This point of the spring energy of the locking wire 121.1 is more important for relocking since the negative force of the force-angle diagram 300 (illustrated in FIG. 3) means that the locking wire 121.1, which is designed as a locking wire spring, has to be put under stress again. This is accomplished by means of the locking spring 122, which is designed as a return element 130, of the locking element 120. This return force of the locking spring 122 must not be too high in order to avoid excessively reducing the additional locking force 306 (illustrated in FIG. 2). The kinematics are configured in such a way that the force required to put the locking wire 121.1 under stress is lower (e.g. over a longer distance) than the force which results for the pressure point in the locked state in the locking position 200.

FIG. 6 shows another section through the top rail 114 with the locking element 120 in the unlocking position 218 (no illustration of the bottom rail 116, illustrated in FIG. 1).

The force profile of the force-angle diagram 300 shows that there is no longer an additional locking force 306 of the locking wire 121.1 acting on the actuating element 134. The actuating element 134 is thus held in the unlocking position 218 not via the locking wire 121.1 but via the bolt 121.3 (control pin). In this case, the vertical wire portions 121.7 (illustrated in FIG. 11) of the locking wire 121 rest against the control cam 121.10 of the bolt 121.3. Wire portion 121.15 and control radius 121.16 are in contact with the control cam 121.10 of the bolt 121.3 only for the initial rapid movement.

A sliding movement of the bolt 121.3 along the locking wire portion 121.15 also serves for secure locking since the locking wire 121.1 must not pivot above the locking element 120 before the locking position 200 of said element is reached since, otherwise, locking would be prevented.

The bolt 121.3 has the predetermined control cam 121.10, which is kinematically significant for locking. The control cam 121.10, in particular an outer contour, e.g. a cam contour, of the bolt 121.3 is a tangentially adjoining linear extension that reliably prevents a control radius 121.16 of the locking wire 121.1 from being moved too far under the bolt 121.3 in the locking position 200 on account of tolerances. Alternatively, it is also possible to provide a perpendicular stop surface adjoining the tangential extension. This could lead to a massive rise in the unlocking force before the actuating element 134 is blocked since the control radius 121.16 would lie in a self-locking manner below the bolt 121.3 in such a case.

Figure 7:
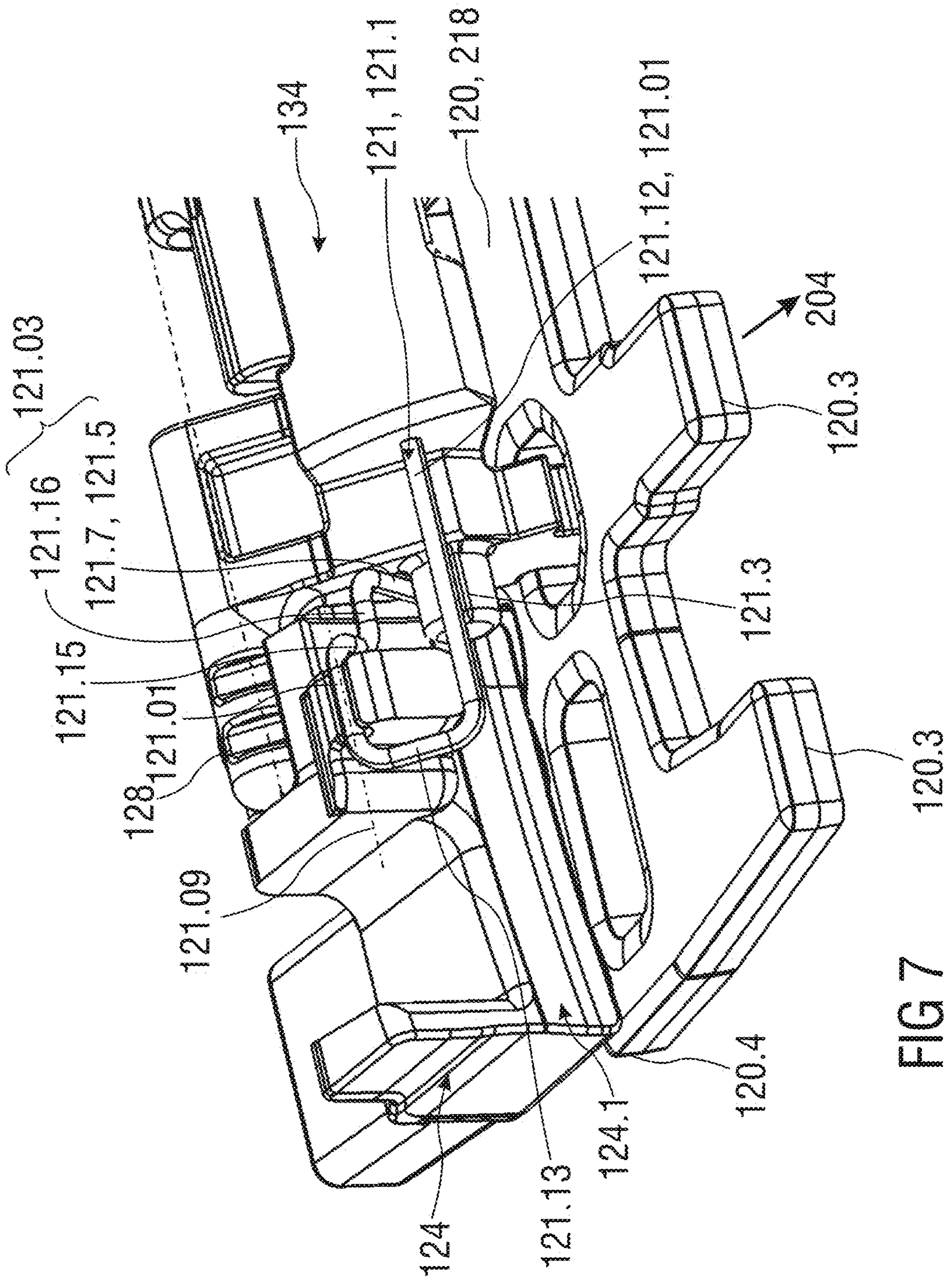
FIG. 7: shows a perspective partial view of the top rail in the region of a bearing for the locking element.

FIG. 7 shows a perspective partial view of the top rail 114 (shown in FIG. 1) in the region of a bearing 128 for the actuating element 134 and of a bearing location for the pivot point 121.9 of the locking wire 121.1, and the stop element 124 for the locking element 120. The control wire portion 121.5 and the vertical wire portion 121.7 rest against the bolt 121.3 (=bearing bolt or control pin of the actuating element 134). The actuating element 134 is rotatably mounted on the top rail 114.

The locking teeth 120.3 project from the plate-shaped locking element 120 in the locking direction 204.

The stop element 124 with its stop surface 124.1 is arranged on the opposite side of the locking element 120 from the locking teeth 120.3. In FIG. 7, the locking element 120 is shown in the unlocking position 218, in which the locking element 120 is arranged with its rear side 120.4 below the stop element 124.

Figure 8:
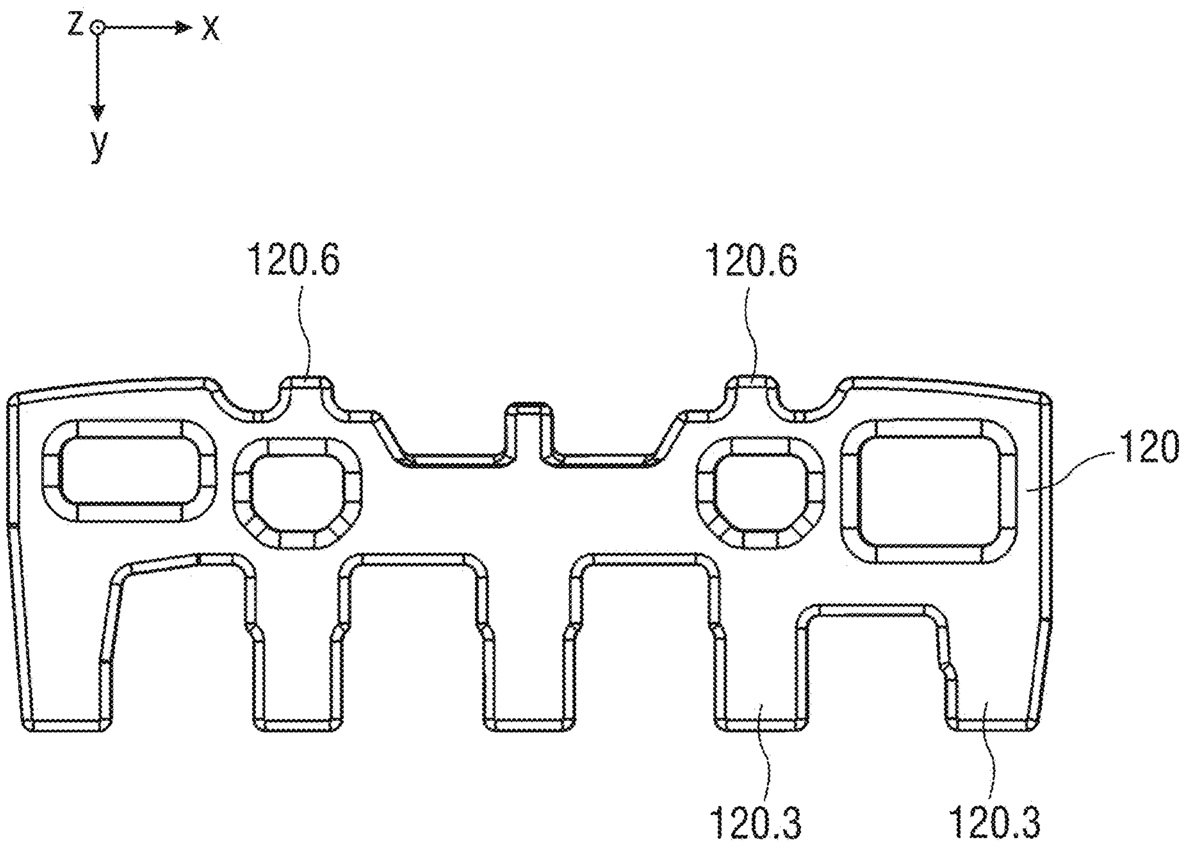
FIG. 8: shows a plan view of the locking element.

FIG. 8 shows a plan view of the locking element 120 with locking teeth 120.3, arranged on one side, for locking the top rail 114 and the bottom rail 116. The locking teeth 120.3 are trapezoidal or have oblique or stepped side flanks.

The locking element 120 has extensions 120.6. These extensions 120.6 are provided for engagement of the locking portion 121.02 (illustrated in FIG. 2) of the locking wire 121.1, in particular the connecting web 121.8 thereof, behind or below the locking element 120.

Figure 9:
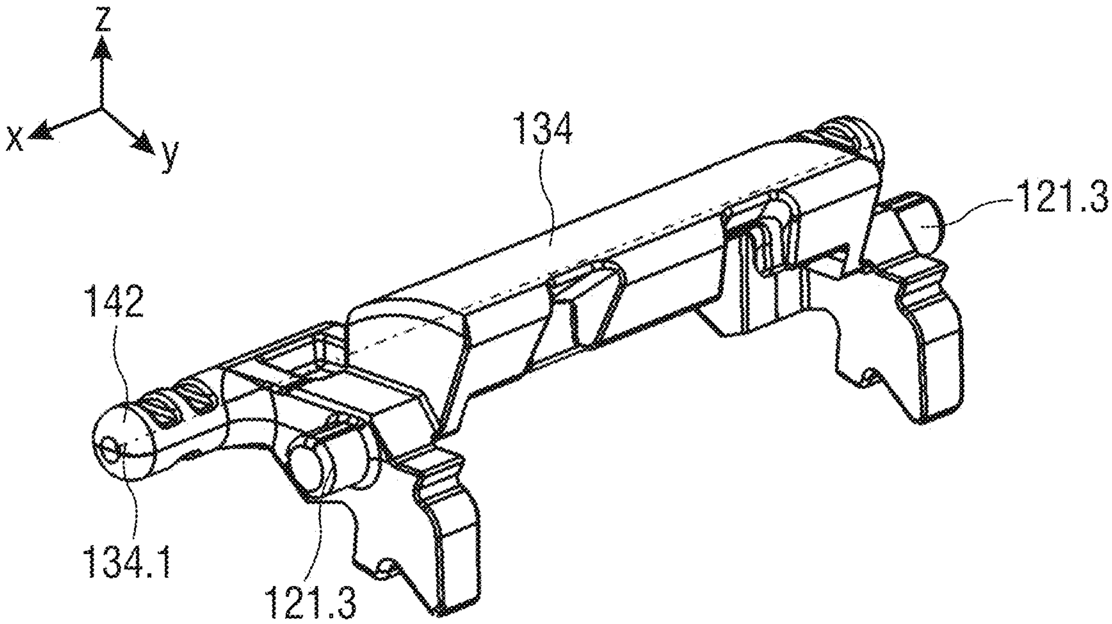
FIG. 9 shows a perspective view of the actuating element.

FIG. 9 shows a perspective view of the actuating element 134 with the bolt 121.3 for the locking wire 121.1, said bolt being designed as a control pin with a control cam 121.10. The actuating element 134 is mounted on the top rail 114 (illustrated in FIG. 2) by means of a bearing journal 142 in such a way as to be rotatable about the bearing axis 134.1.

FIG. 10 shows a perspective view of a bearing unit 144 with the bearing 128 for the locking spring 122 and the bearing points or pivot points 121.9 for the additional lock 121.

FIG. 11 shows a perspective view of the additional lock 121, which is designed as a locking wire 121.1. The locking wire 121.1 comprises at least the following portions or regions: the pivot point 121.9 as the bearing region or bearing portion 121.01, angled control wire portions 121.5 (also referred to as angled spring legs or angled spring arms)

as control portion 121.03, which lie above the pivot point 121.9 and the free spring ends 121.12 of which rest against the actuating element 134, vertical wire portions 121.7 (a region for the bolt 121.3, said region extending from the bearing axis 134.1 to the wire contact region), and the connecting web 121.8 as a lock, a control radius 121.16 situated further away from the pivot point 121.9, and further wire portions 121.15; in this case, the vertical wire portions 121.7 and the connecting web 121.8 as well as the bearing portion 121.01 and the control portion 121.03 can each be in a U shape 121.17.

In the kinematics, the two last-mentioned regions, the wire portions 121.15 and the vertical portions 121.7 and the enclosed control radius 121.16 ensure the movement of the locking wire 121.1 during the opening and closing of the locking element 120 (illustrated in FIG. 7) since these are successively in contact with the bolt 121.3, designed as a control pin, on the actuating element 134 (illustrated in FIG. 7).

In particular, the second distance 210 from the axis of rotation 121.9 (bearing axis/bearing point, also referred to as mounting) of the locking wire 121.1 of the additional lock 121 to its control radius 121.16 (also referred to as a further control wire portion, which is illustrated in FIG. 11) in combination with the first distance 208 between the bearing axis 134.1 of the actuating element 134 (illustrated in FIG. 4) and the first control cam 121.10 (also referred to as control interface or control contact, illustrated in FIG. 4) are the basis for the kinematics with a first very small ratio for a first quicker pivoting movement of the locking wire 121 about its axis of rotation 121.9 than that of the actuating element 134. During the further actuation, in particular unlocking actuation, the control cam 121.10 then shifts in the direction of and along the vertical wire portion 121.7 (as shown in FIG. 6) and brings about only slow pivoting or holding open of the additional lock 121.

Figure 12:
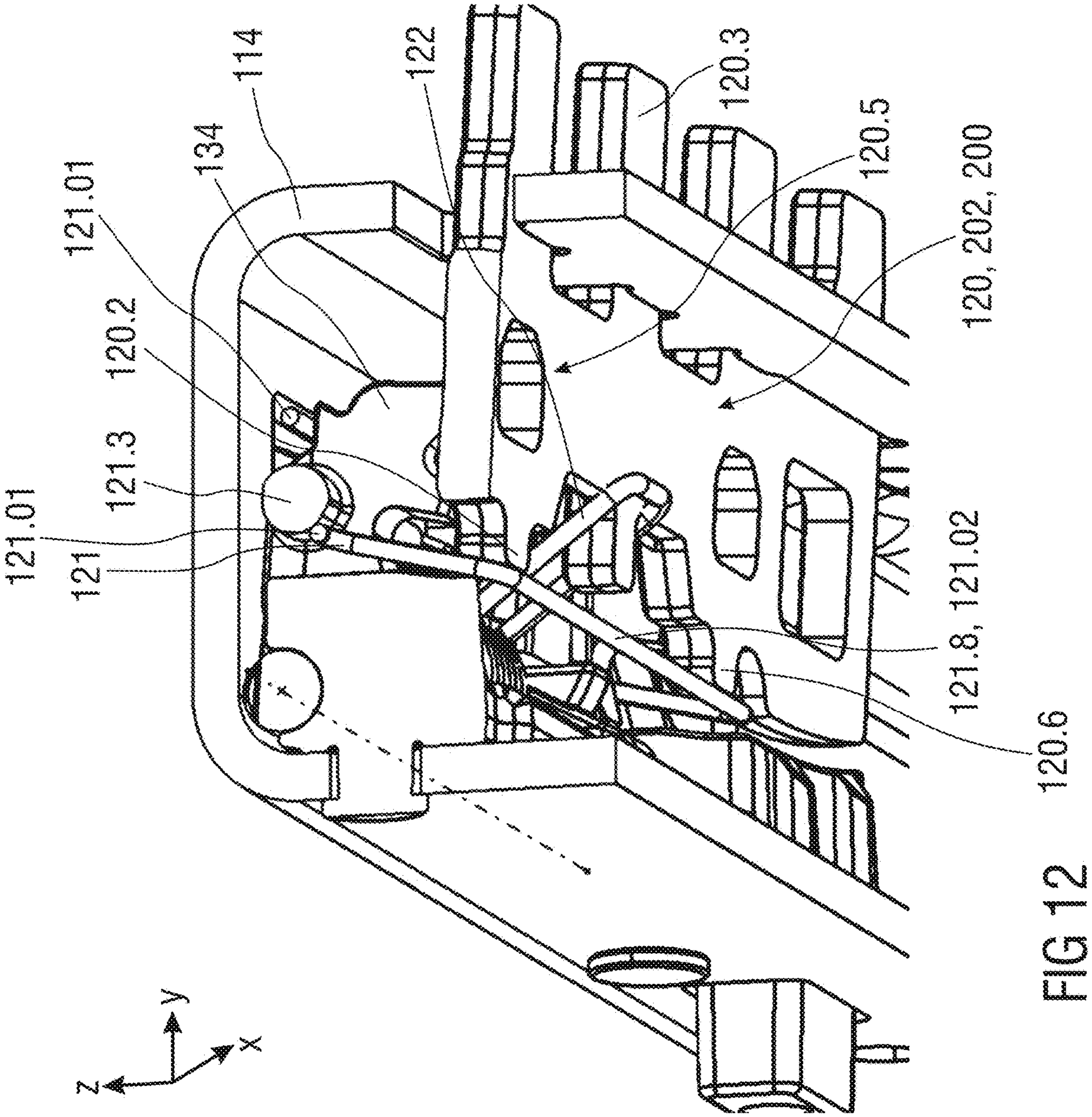
FIG. 12: shows a perspective view of the top rail with locking element, locking spring and additional lock.

The additional lock 121 of the locking element 120 and of the actuating element 134 in the locking position 200 in the vertical direction z takes place via the lower, transverse connecting web 121.8, which rests in shaped features 120.2 on extensions 120.6 (illustrated in FIG. 8) on an underside 120.5 of the locking element 120, as illustrated in FIG. 12. As a result, there is sufficient z overlap.

FIG. 12 shows a perspective view of the top rail 114 with the above-described locking element 120 with locking teeth 120.3 for locking the rail arrangement 112 (illustrated in FIG. 1), the above-described locking spring 122 and the above-described additional lock 121 with bearing portion 121.01, locking portion 121.02 and control portion 121.03 for the secured locking location 202 of the locking element 120.

The additional lock 121, in particular the locking wire 121.1, can be designed, for example, as a formed bent wire part made of spring steel, which, in addition to the pure locking function, also generates a defined pressure point that ensures that, irrespective of the locking plate movements, the wire location below the plate-shaped locking element 120 is maintained in the locking position 200. Moreover, the actuating element 134 is also held in position as a result. The effect of z accelerations in the vertical direction z on the actuating element 134 in the locking position 200 of the locking element 120 is thus greatly reduced.

Figure 13:
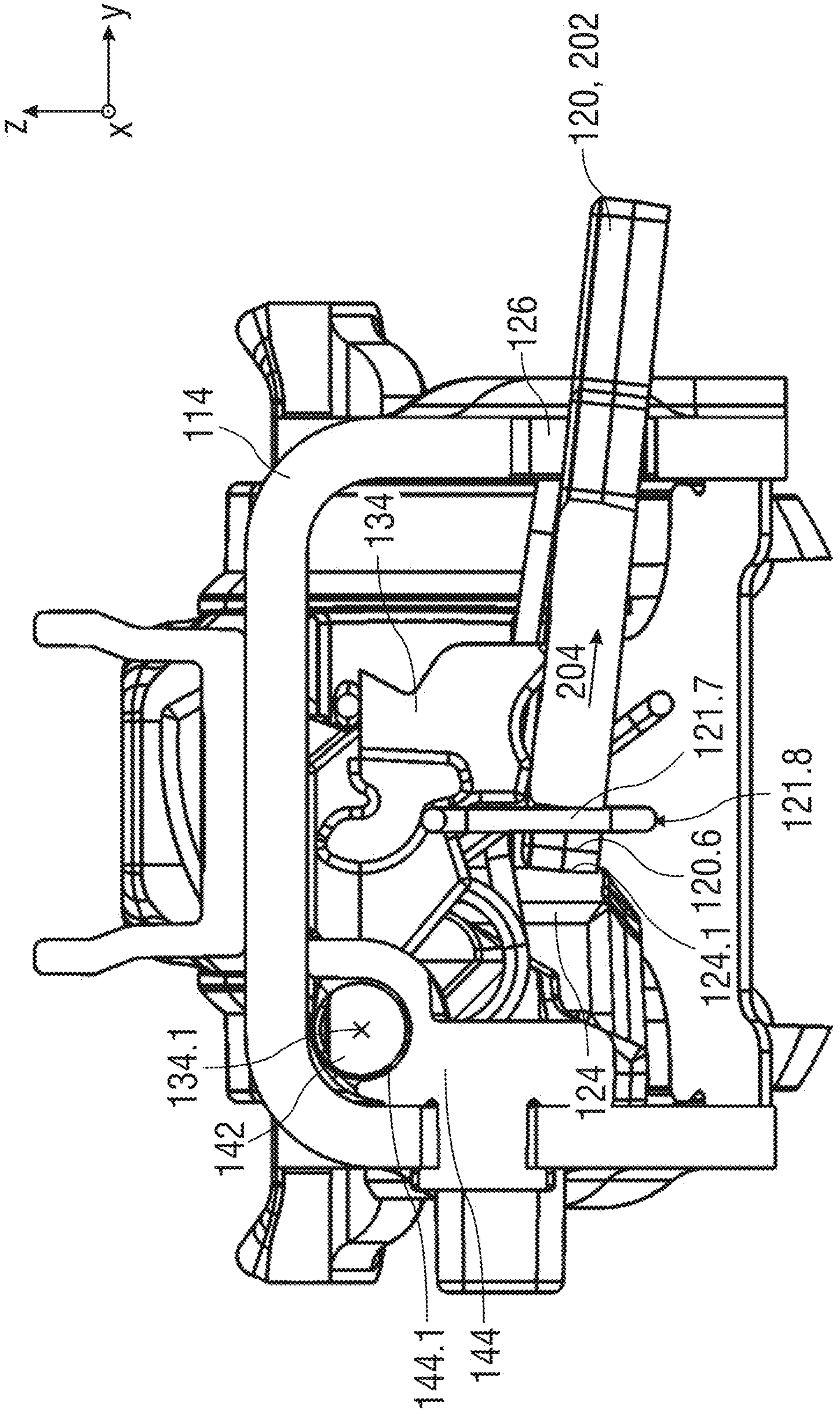
FIG. 13: shows a plan view of the end of a top rail with the locking element of the longitudinal adjustment device.

FIG. 13 shows a plan view of the end of the top rail 114 with locking element 120 and additional lock 121 for the locking element 120, as described above.

The actuating element 134 is mounted in a bearing receptacle 144.1 by means of the bearing journal 142 on the bearing unit 144 in such a way as to be rotatable about the bearing axis 134.1.

The locking element 120 can strike against the stop surface 124.1 of the stop element 124 by means of its rear extension 120.6 in the locking location 202. The locking element 120, in particular the locking plate, makes stop contact, in particular, only when large lateral forces driving out the locking element 120 act on the latter. This can occur, for example, only if a large force, such as that in the case of a rear end collision, acts on the top rail 114 (also referred to as a slider). The toothing of the locking element 120 may be of non-self-locking design.

The additional lock 121 presses by means of its vertical wire portion 121.7 against the locking element 120, in particular a rear side, and presses it into the locking receptacle 126 in the locking direction 204.

LIST OF REFERENCE SIGNS

100 vehicle seat
102 seat part
104 seat back
106 fitting
108 axis of rotation
110 longitudinal adjustment device
112 rail arrangement
114 first rail element (top rail)
116 second rail element (bottom rail)
120 locking element
120.1 abutment point
120.2 shaped feature
120.3 locking tooth
120.4 rear side
120.5 underside
120.6 extension
121 additional lock
121.01 bearing portion
121.02 locking portion
121.03 control portion
121.1 locking wire
121.2 spring torque
121.3 bolt
121.4 bearing contact point
121.5 control wire portion
121.6 further bearing contact point
121.7 vertical wire portion
121.8 connecting web
121.9 axis of rotation/pivot point
121.10 control cam
121.12 spring end
121.13 spring leg portion
121.15 wire portion
121.16 control radius
121.17 U shape
122 locking spring
124 stop element
124.1 stop surface
126 locking receptacle
128 bearing
130 return element
132 cavity
134 actuating element
134.1 bearing axis
134.2 end stop
136 contact point

140 preloading angle
142 bearing journal
144 bearing unit
144.1 bearing receptacle
200 locking position
202 locking location
203 actuating direction
204 locking direction
205 arrow (counter-actuating direction)
208 first distance
210 second distance
212 arrow
214 arrow
216 arrow
218 unlocking position
300 force-angle diagram
302 actuating force
304 locking angle
305 locking force
306 additional locking force
X longitudinal direction
y transverse direction
z vertical direction

The invention claimed is:

1. A longitudinal seat-adjustment device, comprising:
one rail arrangement having at least one rail pair and at least one locking element, wherein the rail arrangement is formed from a top rail and a bottom rail, which are movable relative to one another, wherein the at least one locking element is held in a spring-loaded and movable manner on the top rail and blocks a movement of the top rail in the bottom rail in a locking position, and enables a movement in an unlocking position, and wherein an additional lock is provided, which interacts with the locking element in the locking position in such a way that a movement of the locking element in at least one spatial direction is limited or blocked.

2. The longitudinal seat-adjustment device as claimed in claim 1, wherein the locking element is preloaded in the locking direction by means of the additional lock in the locking position.

3. The longitudinal seat-adjustment device as claimed in claim 1, wherein the additional lock interacts with the locking element in the locking position in such a way that a movement of the locking element perpendicular to the locking direction is limited or blocked.

4. The longitudinal seat-adjustment device as claimed in claim 3, wherein the additional lock limits a lateral movement of the locking element in such a way that the locking element rests against a stop element.

5. The longitudinal seat-adjustment device as claimed in claim 1, wherein the additional lock and the locking element are configured in such a way and interact in such a way that when forces act on the locking element, the locking element remains or is held at such a height in the vertical direction by means of the additional lock that a rear side of the locking element always rests against a stop element or against the stop element.

6. The longitudinal seat-adjustment device as claimed in claim 5, wherein the forces that act on the locking element are unwanted forces acting in the longitudinal direction.

7. The longitudinal seat-adjustment device as claimed in claim 1, wherein the additional lock comprises at least one bearing portion, at least one locking portion and at least one control portion.

8. The longitudinal seat-adjustment device as claimed in claim 1, wherein the additional lock is designed as a locking wire with multiple bends.

9. The longitudinal seat-adjustment device as claimed in claim 1, wherein, on the one hand, the additional lock rests against the actuating element and, on the other hand, is mounted on a bearing unit and optionally rests under a spring preload against the locking element.

10. The longitudinal seat-adjustment device as claimed in claim 1, wherein a locking spring is provided which holds the locking element without play in its locking position.

11. A vehicle seat having the longitudinal seat-adjustment device as claimed in claim 1.

* * * * *